(12) United States Patent
Buhr et al.

(10) Patent No.: US 7,409,251 B2
(45) Date of Patent: Aug. 5, 2008

(54) METHOD AND SYSTEM FOR WRITING NV MEMORIES IN A CONTROLLER ARCHITECTURE, CORRESPONDING COMPUTER PROGRAM PRODUCT AND COMPUTER-READABLE STORAGE MEDIUM

(76) Inventors: Wolfgang Buhr, Braunlager Weg 3, D-22459 Hamburg (DE); Detlef Mueller, Grasweg 6A, D-22885 Barsbuettel (DE)

( * ) Notice: Subject to any disclaimer, the term of this patent is extended or adjusted under 35 U.S.C. 154(b) by 349 days.

(21) Appl. No.: 10/500,064

(22) PCT Filed: Dec. 12, 2002

(86) PCT No.: PCT/IB02/05481

§ 371 (c)(1), (2), (4) Date: May 9, 2005

(87) PCT Pub. No.: WO03/060721

PCT Pub. Date: Jul. 24, 2003

(65) Prior Publication Data

US 2005/0209716 A1 Sep. 22, 2005

(30) Foreign Application Priority Data

Dec. 29, 2001 (DE) ................................ 101 64 422

(51) Int. Cl.
*G06F 19/00* (2006.01)
*G06F 15/00* (2006.01)

(52) U.S. Cl. .............................. 700/87; 712/32; 712/33; 712/34

(58) Field of Classification Search ................... 700/87, 700/32

See application file for complete search history.

(56) References Cited

U.S. PATENT DOCUMENTS

| 4,874,935 | A | * | 10/1989 | Younger | 235/492 |
| 5,377,343 | A | * | 12/1994 | Yaezawa | 711/164 |
| 5,586,291 | A | * | 12/1996 | Lasker et al. | 711/113 |
| 6,292,874 | B1 | * | 9/2001 | Barnett | 711/153 |

OTHER PUBLICATIONS

Ratchev-D., "Are NV-Memories Non-Volatile?" IEEE 1993, pp. 102-106.*
Chen et al., "Write Caching in Distributed File Systems" IEEE 1995 pp. 457-466.*
Sowards-D., "Non-Volatile Memory: The Principles, the technologies, and their significance to the smart card integrated cicuit". Emosyn and Silicon Storage Technology.Jun. 25, 2001, pp. 1-14.*

* cited by examiner

*Primary Examiner*—David Vincent
*Assistant Examiner*—Thomas Stevens
(74) *Attorney, Agent, or Firm*—Peter Zawilski

(57) ABSTRACT

The invention describes a method and an arrangement for writing to NV memories in a controller architecture, together with a corresponding computer program product and a corresponding computer-readable storage medium, which may be used in particular to speed up writing or programming processes in NV code memories of microcontrollers, such as for example smart card controllers.

The method consists in extending the instruction set of the controller by so-called MOVCWR (move code write) instructions, which make it possible to write a defined data word (byte) to a defined destination address within an NV code memory. The data word (byte) is here written to the correct position of the cache page register of the respective NV memory and the page address pointer register of the memory is updated with the associated page address. If an MMU (memory management unit) is present, this MOVCWR writing to the cache page register takes place, like MOVC reading or code fetch, under the control of this MMU.

6 Claims, No Drawings

METHOD AND SYSTEM FOR WRITING NV MEMORIES IN A CONTROLLER ARCHITECTURE, CORRESPONDING COMPUTER PROGRAM PRODUCT AND COMPUTER-READABLE STORAGE MEDIUM

The invention relates to a method and an arrangement for writing to NV memories in a controller architecture, together with a corresponding computer program product and a corresponding computer-readable storage medium, which may be used in particular to speed up writing or programming processes in NV code memories of microcontrollers, such as for example smart card controllers.

The development of microelectronics in the 70s made it possible to produce small computers in credit card format without user interface. Such computers are known as smart cards. In a smart card, data memories and arithmetic and logic units are integrated into a single chip a few square millimeters in size. Smart cards are used in particular as telephone cards, GSM SIM cards and in banking and health. The smart card has thus become an omnipresent computing platform.

Smart cards are currently primarily viewed as a secure storage location for confidential data and as a secure execution platform for cryptographic algorithms. The assumption that the data and algorithms on the card are relatively secure is based in the structure of the hardware of the card and the outward interfaces. Outwardly, the card is a "black box", whose functionality can only be taken advantage of via a well-defined hardware/software interface and which may be used to enforce certain security policies. On the one hand, certain conditions may be attached to access to the data. Critical data, such as for example secret keys of a public key procedure, may even be withheld completely from external access. On the other hand, a smart card is in a position to execute algorithms without execution of the individual operations being observable from outside. The algorithms themselves may be protected on the card from modification and read-out. In the object-oriented sense, the smart card may be regarded as an abstract data type, which has a well-defined interface, exhibits specified behavior and is itself in a position to ensure compliance with certain integrity conditions relating to its status.

There are substantially two different types of smart cards. Memory cards have only a serial interface, an addressing and security logic and ROM and EEPROM memories. These cards have only restricted functionality and serve a specific purpose. They are therefore particularly cheap to produce. Smart cards produced as microprocessor cards in principle constitute a complete general-purpose computer.

The production and delivery process for chip cards is divided into the following phases:
  production of the semiconductor,
  embedding of the semiconductor,
  printing of the card,
  personalization of the card,
  issuing of the card.

In general, each phase is performed by a company specializing in that particular operation. When producing the semiconductors, good in-house security must be ensured, in particular in the case of cards with hard-wired security logic. For a correct end test to be performed by the manufacturer, the complete memory has to be freely accessible. Only after the end test is the chip secured by a transport code. After that, access to the card memory is possible only to those with authorization, who know the transport code. Theft of brand new semiconductors is thus of no consequence. Those with authorization may be personalizers or card issuers. No further securing functions are required for embedding and printing. The relevant companies do not need to know the transport code.

In general, it is not the card manufacturer who transfers the person-specific data to the card, but rather the issuing office (for example bank, telephone company, health insurer etc.). This process is known as personalization, and it does require knowledge of the transport code.

Issuing of the card, i.e. transport from the issuing office to the card holder, poses a further security problem. Strictly speaking, issuing of the card is only truly secure if the card is issued to the holder in person, who signs for it and produces his/her identity card. Although dispatch by post is often more economical, it is not very secure. Communicating the PIN to the card holder is also problematic, and requires the same care as the card.

Given the risky, security-relevant contents of the memories located on smart card controllers, it is necessary not only to observe these security measures but also to ensure additional protection against the possible activities of hackers, which cover all phases of the life of a smart card, from production through transport and use of the card to manipulation of cards which are no longer usable.

When programming relatively large quantities of data/codes into NV memories (for example into the EEPROM during personalization), a relatively large amount of time is lost on the one hand by data transport via the SFR bus and on the other hand by the necessary verification of the written EEPROM data after programming of each page.

At present, the standard instruction sets of controllers provide read-only instructions for the code memory area, i.e. data may either be retrieved from NV memories as instruction codes or read out as a data word ("byte") by a so-called MOVC instruction.

Writing/programming of data into the NV memory has hitherto been performed solely via the register set of the respective memory interface, i.e. the data path used during writing to the NV memory is completely separate from the data path used for code fetch/MOVC reading.

Writing requires a plurality of write accesses to memory interface registers: writing to the address register for page address and byte address, writing to the data register and the control register.

The method used hitherto for writing to NV memories is very slow relative to the code fetch/read method, since it requires two to five register accesses per data word written, depending on type of access, while code fetch and MOVC reading proceed in the quick code fetch cycle of the processor.

Since writing here proceeds solely via the register interface of the memory interface, the memory management unit, which is in overall control of mapping and code memory access rights, does not have any influence during writing to the NV memory. Therefore, writing to the memory can only occur under the control of the operating system of the controller and is possible for application SW only by special calls on system routines.

It is therefore an object of the invention to provide a method, an arrangement and a corresponding computer program product and a corresponding computer-readable storage medium of the above-mentioned type, by means of which the disadvantages of the conventional procedures are avoided and which make it possible to write data into an NV memory in the shortest possible time, without having to interfere substantially with hitherto to used processes, and to ensure a higher degree of protection from programming errors.

A particular advantage of the method for writing to NV memories in a controller architecture consists in the fact that (a) defined data value(s) or (a) defined data word(s) is/are written to (a) defined destination address(es) within the NV memory, by writing the data value(s) or the data word(s) to the predetermined position of the cache page register of the NV memory and updating the page address pointer registers of the NV memory.

An arrangement for writing to NV memories in a controller architecture is advantageously so designed that it comprises a processor which is designed in such a way that writing to NV memories in a controller architecture may be performed, wherein (a) defined data value(s) or (a) defined data word(s) is/are written to (a) defined destination address(es) within the NV memory, by writing the data value(s) or the data word(s) to the predetermined position of the cache page register of the NV memory and updating the page address pointer registers of the NV memory.

A computer program product for writing to NV memories in a controller architecture comprises a computer-readable storage medium, on which a program is stored which, once it has been loaded into the memory of a computer or of a smart card controller, allows the computer or smart card controller to perform writing to NV memories in a controller architecture, wherein (a) defined data value(s) or (a) defined data word(s) is/are written to (a) defined destination address(es) within the NV memory, by writing the data value(s) or the data word(s) to the predetermined position of the cache page register of the NV memory and updating the page address pointer registers of the NV memory.

To perform writing to NV memories in a controller architecture, a computer-readable storage medium is advantageously used on which a program is stored which, once it has been loaded into the memory of a computer or of a smart card controller, allows the computer or smart card controller to perform writing to NV memories in a controller architecture, wherein (a) defined data value(s) or (a) defined data word(s) is/are written to (a) defined destination address(es) within the NV memory, by writing the data value(s) or the data word(s) to the predetermined position of the cache page register of the NV memory and updating the page address pointer registers of the NV memory.

For writing to the NV memory, the instruction set of the controller core is advantageously further extended by additional move code write instructions (MOVCWR instructions). A preferred development of the method according to the invention is characterized in that the additional instructions of the controller core perform a transfer of the parameters for address pointers and for the data value to be written or the data word to be written and activate corresponding control signals for a so-called memory management unit (MMU) and NV memory interfaces.

It has proven advantageous for the address processing for the MOVCWR instructions to be performed in the same way as the processing of code fetches or MOVC instructions, in the presence of a memory management unit (MMU). Moreover, a preferred development of the method according to the invention is characterized in that this MMU is extended by a control signal path in the presence of a memory management unit (MMU) of the controller.

In the presence of an MMU, it is advantageous for only address areas of the NV memory to be written to which have been enabled by the MMU. For writing to NV memories in a controller architecture, it may also prove advantageous for special mapping of the code memory to be taken into account within the address area of the controller in the presence of an MMU.

A further preferred development of the method according to the invention is characterized in that a plurality of data values and/or data words with the same page address are written in succession.

The content of the cache page register is advantageously programmed into the NV memory by writing to the control register of the NV memory. Moreover, a preferred development of the method according to the invention is characterized in that the cache page register of the NV memory is cleared when changing to a new page address in the event of an MOVCWR instruction.

A further advantage of the method according to the invention consists in the fact that undesired programming of old page register contents under incorrect addresses is prevented. Furthermore, a preferred development of the arrangement according to the invention is characterized in that the processor is part of a smart card controller and the arrangement is a smart card.

The method according to the invention offers a number of advantages over the previous method of writing to the cache page register, which was supported solely by the register interface of the NV memory.

Writing to the NV memory with MOVCWR requires only one MOVCWR instruction per data word (byte), with transfer of the two parameters for the address pointer and the data word. In the event of a plurality of successive MOVCWR instructions, an "auto-increment" of the address pointer may be used, as in the case of MOVC reading. This instruction invocation represents a considerable speeding-up of the writing process relative to writing via the address/data register set of the NV memory.

Special address area mapping or access restrictions of the code memory, which are monitored by an optionally present MMU, are valid for MOVCWR in the same way as for code fetch and MOVC, i.e. the processor core undergoes the same memory mapping with MOVCWR as with code fetch/MOVC.

It is therefore also possible for an application SW to use the MOVCWR instruction directly, in order to write to the cache page register of an NV memory without having to invoke a system call. The OS of the controller has control over the rights of access to the memory via the configuration of the MMU control register.

Incorrect programming of old contents of the cache page register of an NV memory to an incorrect page address is no longer possible, since the cache page register is reset with each MOVCWR, whose address pointer changes the page address.

The invention will be further described with reference to an example of embodiment.

The method presented consists in extending the instruction set of the controller by so-called MOVCWR (move code write) instructions, which make it possible to write a defined data word (byte) to a defined destination address within an NV code memory. The data word (byte) is here written to the correct position of the cache page register of the respective NV memory and the page address pointer register of the memory is updated with the associated page address.

If an MMU (memory management unit) is present in the case of advanced smart card controllers, this MOVCWR writing to the cache page register takes place, like MOVC reading or code fetch, under the full control of this MMU, such that it is only possible to write to address areas of the memory which have basically been enabled by the MMU for this purpose. Special mapping of the code memory within the address area of the controller is here taken into account.

In this way, a plurality of bytes/words with the same page address may be written in succession, in order to fill the cache page register. By writing to the control register of the respective NV memory, the content of the cache page register may then be programmed into the NV memory.

Each change to a new page address in the event of an MOVCWR instruction results in immediate clearing of the cache page register of the NV memory, so as to allow programming of data under the new page address and to prevent undesired programming of old page register contents under incorrect addresses.

In the example of embodiment, the instruction set of the controller core is extended by additional MOVCWR instructions, so as to perform writing to NV memories in the manner according to the invention. The additional MOVCWR instructions ensure transfer of the parameters for the address pointer and the data value to be written and activate corresponding control signals for MMU and memory interfaces.

An optionally present MMU (memory management unit) of the controller is extended by a corresponding control signal path, which generates the corresponding chip select signals for the memory interfaces when executing the MOVCWR instruction. Address processing for the MOVCWR instructions (or mapping and access rights) does not differ here from processing of code fetches or MOVC instructions.

The memory interfaces of the NV memories support this function by a corresponding write mode for the cache page registers and an updating function of the address registers after each MOVCWR process. In addition, a reset logic before each MOVCWR process implements an address comparison between old and new page addresses and optionally causes clearing of the old register content before writing to the cache page register in the event of an address change.

The invention is not limited to the examples of embodiment described here. Instead, it is possible to achieve further variant embodiments by combining and modifying the stated means and features, without going beyond the scope of the invention.

The invention claimed is:

1. A method for writing a data value to a location within non-volatile (NV) memory of a smart card, the smart card having a processor that is adapted to read from and write to the NV memory, the method comprising:
   providing an instruction to the processor of the smart card, the instruction containing the data value and an address pointer that identifies the location within the NV memory; and
   using the processor, writing the data value to the location within the NV memory identified by the address pointer; and
   characterized in that, for writing to the NV memory, an instruction set of the processor is extended by additional move code write instructions (MOVCWR instructions).

2. A method as claimed in claim 1, characterized in that the additional instructions of the processor perform a transfer of parameters for address pointer and for the data value to be written and activate corresponding control signals for a memory management unit (MMU) and NV memory interfaces.

3. A method as claimed in claim 1, characterized in that the address processing for the MOVCWR instructions is performed in the same way as the processing of code fetches or MOYC instructions, in the presence of a memory management unit (MMU).

4. A method as claimed in claim 2, characterized in that the MMU is extended by a control signal path in the presence of a memory management unit (MMU) of the processor.

5. A method for writing a data value to a location within non-volatile (NV) memory of a smart card, the smart card having a processor that is adapted to read from and write to the NV memory, the method comprising:
   providing an instruction to the processor of the smart card, the instruction containing the data value and an address pointer that identifies the location within the NV memory; and
   using the processor, writing the data value to the location within the NV memory identified by the address pointer;
   characterized in that the content of a cache page register is programmed into the NV memory by writing to a control register of the NV memory; and
   characterized in that the cache page register of the NV memory is cleared when changing to a new page address in an event of an MOVCWR instruction.

6. A method for writing a data value to a location within non-volatile (NV) memory of a smart card, the smart card having a processor that is adapted to read from and write to the NV memory, the method comprising:
   providing an instruction to the processor of the smart card, the instruction containing the data value and an address pointer that identifies the location within the NV
   using the processor, writing the data value to the location within the NV memory identified by the address pointer; and
   characterized in that undesired programming of old page register contents under incorrect addresses is prevented.

* * * * *